(12) United States Patent
Chen et al.

(10) Patent No.: US 10,000,646 B2
(45) Date of Patent: Jun. 19, 2018

(54) METHOD FOR PREPARING SILICA NANOPARTICLES

(71) Applicant: NATIONAL CHENG KUNG UNIVERSITY, Tainan (TW)

(72) Inventors: Yen-Hua Chen, Tainan (TW); Pin-Jung Lai, New Taipei (TW); Chi-Hui Liang, Pingtung County (TW)

(73) Assignee: National Cheng Kung University, Tainan (TW)

( * ) Notice: Subject to any disclaimer, the term of this patent is extended or adjusted under 35 U.S.C. 154(b) by 0 days. days.

(21) Appl. No.: 15/347,405

(22) Filed: Nov. 9, 2016

(65) Prior Publication Data

US 2018/0127601 A1    May 10, 2018

(51) Int. Cl.
| | | |
|---|---|---|
| *B22F 1/00* | (2006.01) | |
| *C09D 7/12* | (2006.01) | |
| *C01B 33/32* | (2006.01) | |
| *C01B 33/193* | (2006.01) | |
| *B01J 2/04* | (2006.01) | |
| *C08K 3/36* | (2006.01) | |
| *C08K 9/00* | (2006.01) | |

(52) U.S. Cl.
CPC .............. *C09D 7/1216* (2013.01); *B01J 2/04* (2013.01); *C01B 33/193* (2013.01); *C01B 33/32* (2013.01); *C09D 7/1266* (2013.01); *C01P 2004/64* (2013.01); *C08K 3/36* (2013.01); *C08K 9/00* (2013.01)

(58) Field of Classification Search
CPC ........ C09D 7/1216; C09D 7/1266; B01J 2/04; C01B 33/193; C01B 33/32; C01P 2004/64; C08K 3/36; C08K 9/00
USPC ............................................................ 524/1
See application file for complete search history.

(56) References Cited

U.S. PATENT DOCUMENTS 7,799,303 B2 *  9/2010  Jang .................. C01B 33/18
                                               423/335

* cited by examiner

*Primary Examiner* — Hui Chin
(74) *Attorney, Agent, or Firm* — The Webb Law Firm

(57) ABSTRACT

A method for preparing silica nanoparticles includes the steps of: slowly titrating a sodium silicate solution with an acid solution to obtain a silicic acid-containing solution; continuously stirring the silicic acid-containing solution; slowly titrating the silicic acid-containing solution with the acid solution to obtain a silicic acid-enriched solution; continuously stirring the silicic acid-enriched solution; collecting the silicic acid-enriched solution as a silica nanoparticle precursor solution when a pH value of the silicic acid-enriched solution reaches a target pH value; and subjecting the silica nanoparticle precursor solution to a flame spray pyrolysis or a drying-grinding-calcining treatment.

19 Claims, 4 Drawing Sheets

METHOD FOR PREPARING SILICA NANOPARTICLES

FIELD

The disclosure relates to a method for preparing silica nanoparticles, and more particularly to a method for preparing silica nanoparticles from a siliceous rock.

BACKGROUND

Silicon (Si) is the second most abundant element in the earth's crust and exists in rocks mostly in the form of silica. Silica has various uses. For example, it can be used to produce utensils, optical lenses, optical components, and decorative artificial jewels. It can also be added to a coating material to provide the coating material with a hydrophobic property so as to permit the coating material to possess water-proof and/or seepage-proof effects.

The hydrophobic property of the coating material may be further enhanced by adding nano-sized silica particles to the coating material. Uniformity of the hydrophobic property of the coating material added with the nano-sized silica particles depends on the particle size distribution of the nano-sized silica particles. When the particle size distribution of the nano-sized silica particles is narrow, the hydrophobic property of the coating material added with the nano-sized silica particles is relatively uniform. It has been found in the art that the hydrophobic property of the coating material may be further enhanced when the silica particles have a particle size distribution ranging from 20 nm to 40 nm.

Silica nanoparticles may be prepared by various methods. For example, U.S. Pat. No. 7,799,303 B2 discloses a method for preparing silica nanoparticles from siliceous mudstone, which includes: heat-treating the siliceous mudstone to remove water; leaching the siliceous mudstone with hydrochloric acid to remove impurities, thereby forming a silica constituent; leaching the silica constituent with sodium hydroxide, thereby forming a sodium silicate aqueous solution; passing the sodium silicate aqueous solution over an ion-exchange resin, thereby producing a silicate aqueous solution having a sodium concentration of 50 ppm or less; and flame spray pyrolyzing the silicate aqueous solution with a flame reactor to prepare nanoparticles from the silicate aqueous solution.

Although the silica nanoparticles may be prepared by the method disclosed in U.S. Pat. No. 7,799,303 B2, the particle size distribution of the silica nanoparticles thus prepared is relatively wide. Therefore, the hydrophobic property uniformity of the coating material added with the silica nanoparticles thus prepared may be unsatisfactory.

It is desirable in the art to provide a method for preparing silica nanoparticles having a relatively narrow particle size distribution.

SUMMARY

Therefore, an object of the disclosure is to provide a method for preparing silica nanoparticles having a relatively narrow particle size distribution.

According to a first aspect of the disclosure, there is provided a method for preparing a silica nanoparticle precursor solution, which comprises the steps of:

a) pre-treating a siliceous rock to form a sodium silicate solution;

b) slowly titrating the sodium silicate solution with an acid solution under stirring until a pH value of the sodium silicate solution is reduced by a predetermined value so as to obtain a silicic acid-containing solution;

c) continuously stirring the silicic acid-containing solution until a pH value of the silicic acid-containing solution becomes constant;

d) slowly titrating the silicic acid-containing solution with the acid solution under stirring until the pH value of the silicic acid-containing solution is reduced by a predetermined value so as to obtain a silicic acid-enriched solution; and e) if a pH value of the silicic acid-enriched solution does not reach a target pH value, continuously stirring the silicic acid-enriched solution until the pH value of the silicic acid-enriched becomes constant.

According to a second aspect of the disclosure, there is provided a method for preparing silica nanoparticles, which comprises the steps of:

a) pre-treating a siliceous rock to form a sodium silicate solution;

b) slowly titrating the sodium silicate solution with an acid solution under stirring until a pH value of the sodium silicate solution is reduced by a predetermined value so as to obtain a silicic acid-containing solution;

c) continuously stirring the silicic acid-containing solution until a pH value of the silicic acid-containing solution becomes constant;

d) slowly titrating the silicic acid-containing solution with the acid solution under stirring until the pH value of the silicic acid-containing solution is reduced by a predetermined value so as to obtain a silicic acid-enriched solution;

e) if a pH value of the silicic acid-enriched solution does not reach a target pH value, continuously stirring the silicic acid-enriched solution until the pH value of the silicic acid-enriched becomes constant;

f) collecting the silicic acid-enriched solution as the silica nanoparticle precursor solution when the pH value of the silicic acid-enriched solution reaches the target pH value; and g) subjecting the silica nanoparticle precursor solution to a flame spray pyrolysis or a drying-grinding-calcining treatment to form the silica nanoparticles.

According to a third aspect of the disclosure, there is provided a paint composition, which comprises:

the silica nanoparticles prepared by the aforesaid method in an amount ranging from about 0.5 part by weight to about 1 part by weight;

a crosslinking agent selected from the group consisting of polyisocyanate, melamine, aziridine, carbodiimide, and combinations thereof in an amount ranging from about 4 parts by weight to about 5 parts by weight; and a balance of a water-based paint based on 100 parts by weight of the paint composition.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
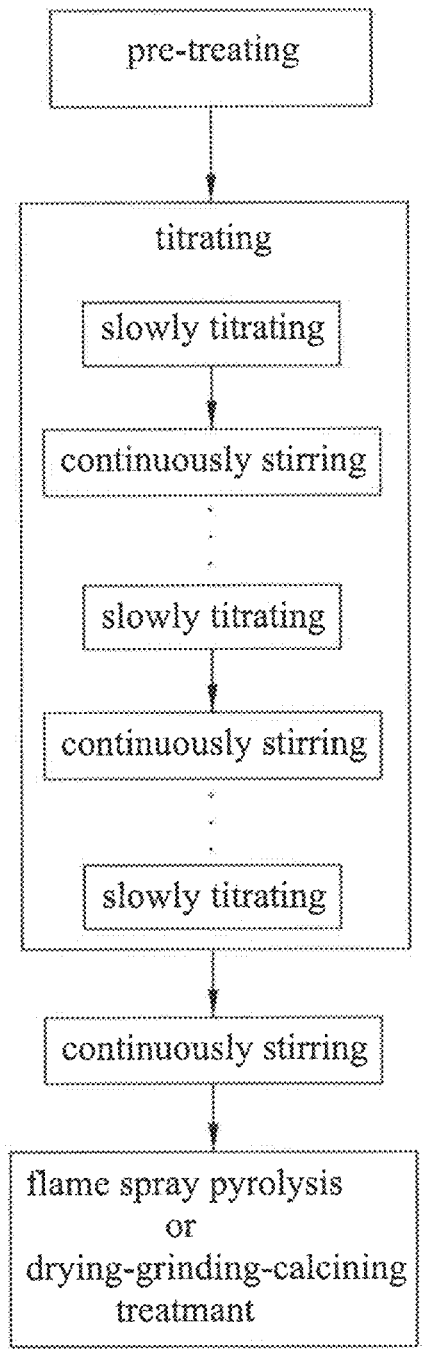
FIG. 1 is a flow chart of an embodiment of a method for preparing silica nanoparticles according to the disclosure.

With reference to FIG. 1, a method for preparing silica nanoparticles according to the disclosure is shown to comprise the steps of:

A) pre-treating a siliceous rock to form a sodium silicate solution;

B) slowly titrating the sodium silicate solution with an acid solution under stirring until a pH value of the sodium silicate solution is reduced by a predetermined value so as to obtain a silicic acid-containing solution;

C) continuously stirring the silicic acid-containing solution until a pH value of the silicic acid-containing solution becomes constant;

D) slowly titrating the silicic acid-containing solution with the acid solution under stirring until the pH value of the silicic acid-containing solution is reduced by a predetermined value so as to obtain a silicic acid-enriched solution;

E) continuously stirring the silicic acid-enriched solution until the pH value of the silicic acid-enriched becomes constant;

F) slowly titrating the silicic acid-enriched solution with the acid solution under stirring until the pH value of the silicic acid-enriched solution is reduced by a predetermined value, repeating steps E) and F) at least one time if the pH value of the silicic acid-enriched solution does not reach a target pH value;

G) collecting the silicic acid-enriched solution as the silica nanoparticle precursor solution when the pH value of the silicic acid-enriched solution reaches the target pH value; and H) subjecting the silica nanoparticle precursor solution to a flame spray pyrolysis or a drying-grinding-calcining treatment to form the silica nanoparticles.

The siliceous rock suitable for the method for preparing silica nanoparticles according to the disclosure includes, for example, quartz arenite, siliceous shale, siliceous schist, siliceous oozes, tholeiite, granite, siliceous mudstone, or the like.

In the following illustrated examples, siliceous mudstone is used. Siliceous mudstone is usually composed of clay and carbonate microparticles, and has a particle size less than $1/256$ mm.

In the pre-treating step, the siliceous rock is crushed and ground to form siliceous rock powders. The siliceous rock powders are then sieved, followed by an ultrasonic wash to remove large-sized impurities from the siliceous rock powders.

After removal of the large-size impurities, the siliceous rock powders are treated by the sub-steps of: A1) leaching with an acidic leaching solution and A2) leaching with a basic leaching solution.

In sub-step A1), the siliceous rock powders are leached with an acidic leaching solution at a temperature below a boiling point of the acidic leaching solution to remove non-siliceous components (for example, metal oxides) so as to form acid-leached siliceous rock powders. The leaching with the acidic leaching solution is preferably performed at an elevated temperature so as to enhance the leaching effect. However, the elevated temperature should be below the boiling point of the acidic leaching solution so as to prevent evaporation of the acidic leaching solution, which may lead to change in the concentration of the acidic leaching solution. In certain embodiments, the acidic leaching solution is a sulfuric acid solution having a concentration ranging from about 3 M to about 6 M, and sub-step A1) is performed at a temperature ranging from about 80° C. to about 95° C. for a period ranging from about 22 hours to about 26 hours. When the concentration of the acidic leaching solution is too low, the temperature for the acid leaching will be too low, or the period for the acid leaching will be too short, so that the impurities, such as the metal oxides, may not be effectively removed. On the other hand, when the concentration of the acidic leaching solution is too high or the period for the acid leaching is too long, the leaching effect may not be further enhanced.

In subsequent sub-step A2), the acid-leached siliceous rock powders are further leached with a basic leaching solution at a temperature below a boiling point of the basic leaching solution to obtain the sodium silicate solution. Similarly, the leaching with the basic leaching solution is preferably performed at an elevated temperature so as to enhance the leaching effect. However, the elevated temperature should be below the boiling point of the basic leaching solution so as to prevent evaporation of the basic leaching solution, which may lead to change in the concentration of the basic leaching solution. In certain embodiments, the basic leaching solution is a sodium hydroxide solution having a concentration ranging from about 25 wt % to about 35 wt %, and sub-step A2) is performed at a temperature ranging from about 80° C. to about 95° C. for a period ranging from about 28 hours to about 32 hours. When the concentration of the basic leaching solution is too low, the temperature for the basic leaching is too low or too high, or the period for the base leaching is too short, silica may not effectively react to form sodium silicate. On the other hand, when the concentration of the basic leaching solution is too high or the period for the base leaching is too long, the effect for the reaction of silica to form sodium silicate may not be further enhanced.

Titration of the sodium silicate solution with an acid solution permits sodium silicate to perform a reaction to form silicic acid. Sodium silicate is also known as water glass. The sodium silicate solution is usually in the form of viscous paste. In the procedure of titrating the sodium silicate solution with the acid solution, the sodium silicate solution gradually becomes a silicic acid-containing solution which is gradually enriched in silicic acid and which has a gradually increasing viscosity. In order to avoid insufficient mixing between the acid solution and the sodium silicate solution during titration, which may result in incomplete reaction of sodium nitrate, a plurality of steps of slowly titrating with the acid solution and a plurality of steps of continuously stirring are alternately performed in the method for preparing silica nanoparticles of the disclosure.

Specifically, the sodium silicate solution is slowly titrated with the acid solution under stirring until a pH value of the sodium silicate solution is reduced by a predetermined value so as to obtain a silicic acid-containing solution. The silicic acid-containing solution is continuously stirred until a pH value of the silicic acid-containing solution becomes constant. The silicic acid-containing solution is then slowly titrated with the acid solution until the pH value of the silicic acid-containing solution is reduced by a predetermined value so as to obtain a silicic acid-enriched solution. The silicic acid-enriched solution is then continuously stirred until a pH value of the silicic acid-enriched becomes constant. The silicic acid-enriched solution is then slowly titrated with the acid solution under stirring until the pH value of the silicic acid-enriched solution is reduced by a predetermined value. The aforesaid step of continuously stirring the silicic acid-enriched solution and the aforesaid step of slowly titrating the silicic acid-enriched solution with the acid solution under stirring are alternately repeated until a pH value of the silicic acid-enriched solution reaches a target pH value of about 7. In other words, N additional steps of slowly titrating the silicic acid-enriched solution with the acid solution may be performed to permit the silicic acid-enriched solution to reach the target pH value, wherein N is an integer larger than 1 and each of the N additional steps of slowly titrating the silicic acid-enriched solution is performed until the pH value of the silicic acid-enriched solution is reduced by a predetermined value. In addition, the step of continuously stirring the silicic acid-enriched solution is performed between two successive ones of the steps of slowly titrating the silicic acid-enriched solution. The silicic acid-enriched solution is collected as the silica nanoparticle precursor solution when the pH value of the silicic acid-enriched solution reaches the target pH value.

It is found by the inventors of the disclosure that silica nanoparticles having a relatively narrow particle size distribution may be produced from the silica nanoparticle precursor solution prepared by the aforesaid specific titration procedure.

In certain embodiments, the predetermined value of the pH value reduction in each titration step is about 1. The acid solution used for the titration procedure is a hydrochloric acid solution having a concentration ranging from about 3 wt % to about 7 wt%. Each titration step is performed at a temperature ranging from about 55° C. to about 75° C. Each stirring step is performed for a period ranging from about 25 minutes to about 35 minutes.

The silica nanoparticle precursor solution thus prepared is then subjected to a flame spray pyrolysis or a drying-grinding-calcining treatment to form the silica nanoparticles. In the illustrated examples, the drying-grinding-calcining treatment is used, which includes the sub-steps of: i) drying the silica nanoparticle precursor solution to form a dried silica nanoparticle precursor; ii) grinding the dried silica nanoparticle precursor to form silica nanoparticle precursor powders; and iii) calcining the silica nanoparticle precursor powders at a temperature ranging from about 900° C. to about 1000° C. to obtain the silica nanoparticles of a cristobalite phase.

In certain embodiments, the silica nanoparticle precursor solution may be continuously stirred for an additional period ranging from about 3 hours to about 13 hours prior to the flame spray pyrolysis or the drying-grinding-calcining treatment such that the silica nanoparticles prepared after the flame spray pyrolysis or the drying-grinding-calcining treatment have a relatively uniform particle size distribution ranging from 20 nm to 40 nm.

The silica nanoparticles prepared by the method of the disclosure involving the aforesaid specific titration procedure may have a relatively narrow particle size distribution, which ranges from 20 nm to 40 nm in certain embodiments and is even around 40 nm in certain embodiments.

Therefore, the silica nanoparticles prepared by the method of the disclosure may be added to a paint composition so as to provide the paint composition with improved water-proof and/or seepage-proof effects. The paint composition comprises the silica nanoparticles in an amount ranging from about 0.5 part by weight to about 1 part by weight; a crosslinking agent selected from the group consisting of polyisocyanate, melamine, aziridine, carbodiimide, and combinations thereof in an amount ranging from about 4 parts by weight to about 5 parts by weight; and a balance of a water-based paint based on 100 parts by weight of the paint composition.

In certain embodiments, hexamethylene diisocyanate (HDI) is used as the crosslinking agent. One of the functional isocyanato (—NCO) end groups of HDI bonds to $SiO_2$ and the other of the functional isocyanato end groups of HDI bonds to polymer in the water-based paint such that surface compatibility between the silica nanoparticles and the polymer may be enhanced so as to permit the silica nanoparticles to disperse in the water-based paint stably.

Examples of the disclosure will be described hereinafter. It is to be understood that these examples are exemplary and explanatory and should not be construed as a limitation to the disclosure.

Example 1

Mudstone from Kutingkeng formation in Taiwan was ground into mudstone powders. The mudstone powders were sieved through a 200-mesh sieve, followed by ultrasonic vibration in deionized water and then centrifuge cleaning treatment using deionized water to obtain clean mudstone powders. The clean mudstone powders were calcined in a furnace at 800° C. to remove carbonaceous organic materials and moisture from the clean mudstone powders. The clean mudstone powders after calcination was acid-washed with a 5M sulfuric acid solution (boiling point: 105° C.) at 90° C. for 24 hours, followed by a wash using deionized water and drying by baking. The composition of the mudstone powders thus obtained was analyzed and is recorded in Table 1. The mudstone powders after acid washing were subjected to a reaction in a 30 wt % sodium hydroxide solution (boiling point: 125° C.) at 90° C. for 30 hours, followed by filtration to obtain a sodium silicate solution as a clarified liquid (pH=13.7).

The sodium silicate solution was then subjected to a titration procedure using a 5 wt % hydrochloric acid solution (boiling point: 100° C.) at 65° C. until a pH value of about 7 was achieved so as to obtain a silicic acid solution. The titration procedure was perforated in seven slow titration steps and six continuous stirring steps in which each of the continuous stirring steps was performed between two successive slowing titration steps. Each of the slow titration steps was performed under stirring at 300 rpm until the pH value of the sodium silicate solution was reduced by 1. Each of the continuous stirring steps was performed at 300 rpm for 30 minutes.

The silicic acid solution was further continuously stirred at 300 rpm at 65° C. for 4 hours.

The silicic acid solution was then washed using deionized water, dried by baking, ground, and calcined in a furnace at 950° C. to obtain silica nanoparticles.

Figure 2:
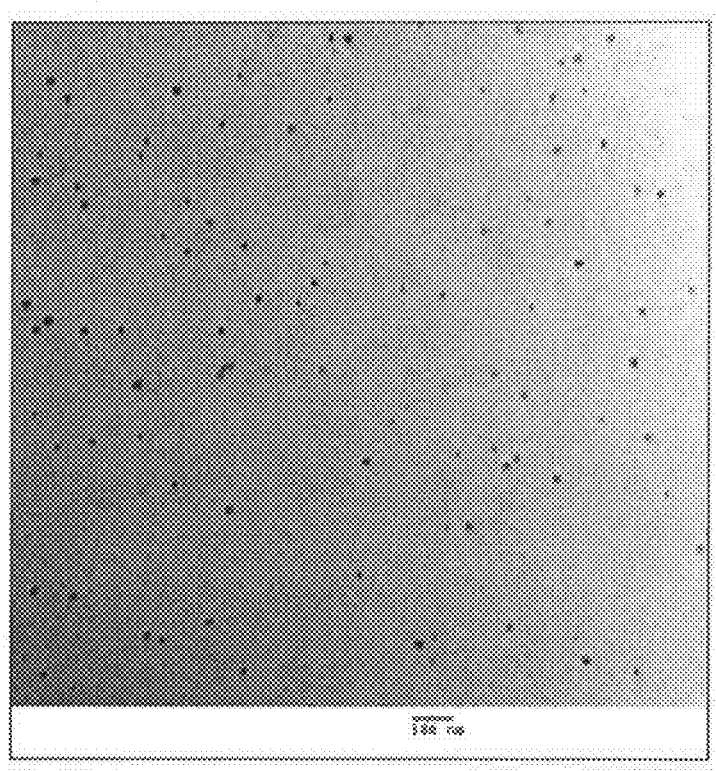
FIG. 2 is a transmission electron microscopic (TEM) image of the silica nanoparticles prepared in Example 1.

The silica nanoparticles were observed using a transmission electron microscope. An image of the silica nanoparticles is shown in FIG. 2. An average particle size of the silica nanoparticles is about 20 nm. A particle size difference between the largest nanoparticle and the smallest nanoparticle in the silica nanoparticles is about 4.9 nm, indicating that the silica nanoparticles prepared in this example have a substantially uniform particle size distribution.

Example 2

Figure 3:
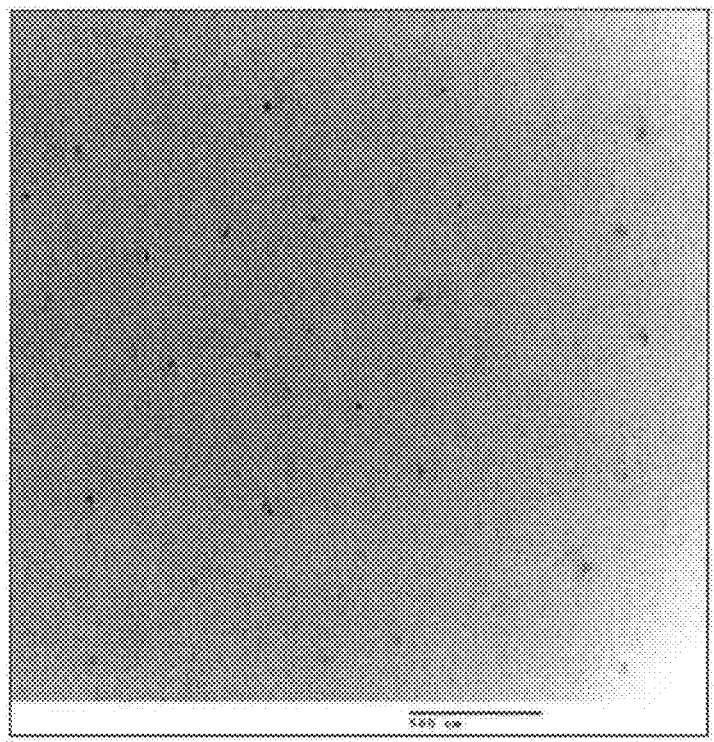
FIG. 3 is a TEM image of the silica nanoparticles prepared in Example 2.

The procedure of Example 1 was repeated except that the silicic acid solution obtained after the titration procedure was continuously stirred for 12 hours. An image of the silica nanoparticles observed using the transmission electron microscope is shown in FIG. 3. An average particle size of the silica nanoparticles is about 40 nm. A particle size difference between the largest nanoparticle and the smallest nanoparticle in the silica nanoparticles is about 0.2 nm, indicating that the silica nanoparticles prepared in this example have a substantially uniform particle size distribution.

Comparative Example 1

Figure 4:
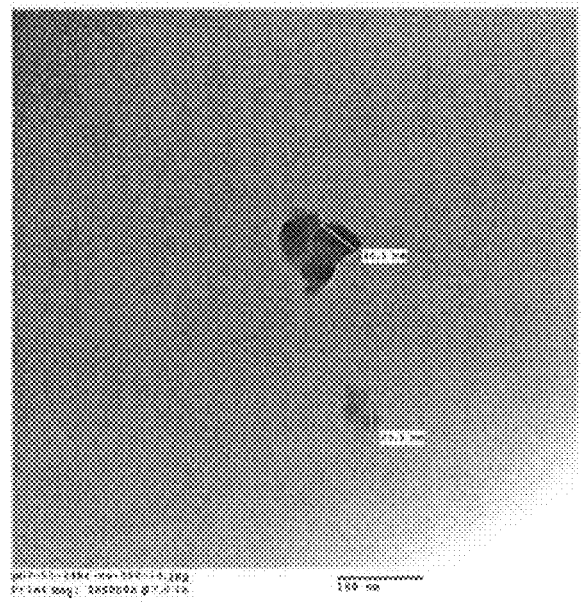
FIG. 4 is a TEM image of the silica nanoparticles prepared in Comparative Example 1.

The procedure of Example 1 was repeated except that the titration procedure was performed by continuously titrating the sodium silicate solution using the hydrochloric acid solution without the continuous stirring steps. An image of the silica nanoparticles observed using the transmission electron microscope is shown in FIG. 4. A particle size difference between the largest nanoparticle and the smallest nanoparticle in the silica nanoparticles is about 17 nm, indicating that the particle size uniformity of the silica nanoparticles prepared in this example is unsatisfactory.

Comparative Example 2

Mudstone from Kutingkeng formation in Taiwan was ground into mudstone powders. The mudstone powders were sieved through a 200-mesh sieve, followed by ultrasonic vibration in deionized water and then centrifuge cleaning treatment using deionized water to obtain clean mudstone powders. The clean mudstone powders were calcined in a furnace at 800° C. to remove carbonaceous organic materials and moisture from the clean mudstone powders. The clean mudstone powders after calcination was acid-washed with a 5M hydrochloric acid solution at 90° C. for 24 hours. The composition of the mudstone powders after the acid washing was analyzed and is recorded in Table 1.

TABLE 1

|  | Ex. 1 | Comp. Ex. 2 |
|---|---|---|
| $SiO_2$ | 94.44 | 89.79 |
| $Al_2O_3$ | 0.09 | 3.45 |
| $P_2O_5$ | 0.02 | 0.02 |
| $K_2O$ | 0.47 | 1.15 |
| CaO | 0.13 | 0.16 |
| $TiO_2$ | 1.32 | 0.48 |
| MnO | 0 | 0 |
| $Fe_2O_3$ | 0.18 | 1.35 |
| Others | 3.35 | 3.6 |
| Total | 100 | 100 |

As shown hereinabove, in Examples 1 and 2, the titration procedure was performed in a specific manner in which each of the continuous stirring steps was performed between two successive slowing titration steps. The particle size differences between the largest nanoparticle and the smallest nanoparticle in the silica nanoparticles in Examples 1 and 2 are about 4.9 nm and 0.2 nm, respectively, which are significantly smaller than that (17 nm) in Comparative Example 1. In addition, the particle size distributions of the silica nanoparticles obtained in Examples 1 and 2 range from 20 nm to 40 nm.

As shown in Table 1, metal oxides such as $Al_2O_3$, $K_2O$, and $Fe_2O_3$ contained in the mudstone powders may be relatively effectively removed via an acid wash using a sulfuric acid solution as compared to an acid wash using a hydrochloric acid solution.

Examples 3 to 6

The silica nanoparticles obtained in Example 1, hexamethylene diisocyate (HDI) used as a crosslinking agent, a white water-based paint (Model No. 450 commercially available from Yung Chi Paint & Varnish Mfg. Co., Ltd., Taiwan) were mixed under vibration in amounts shown in Table 2 to obtain paint compositions. The amounts shown in Table 2 are based on 100 parts by weight of the paint composition. Each of the paint compositions obtained in Examples 3 to 6 was coated onto an acrylic plate to form a paint coating on the acrylic plate. A water droplet was deposited OR dispensed onto the paint coating, and a contact angle was measured. The results are shown in Table 2.

Comparative Example 3

The white water-based paint without adding the silica nanoparticles obtained in Example 1 and hexamethylene diisocyate was coated onto an acrylic plate to form a paint coating on the acrylic plate. A water droplet was deposited or dispensed onto the paint coating, and a contact angle was measured. The result is also shown in Table 2.

TABLE 2

|  | Parts by weight | | | Contact |
| --- | --- | --- | --- | --- |
|  | Silica nanoparticles | HDI | Water-based paint | angle (°) |
| Ex. 3 | 0.5 | 4 | 95.5 | 79.3 |
| Ex. 4 | 0.5 | 5 | 94.5 | 85.7 |
| Ex. 5 | 1 | 4 | 95 | 83.2 |
| Ex. 6 | 1 | 5 | 94 | 86.1 |
| Comp. Ex. 3 | 0 | 0 | 100 | 71.7 |

Generally, if the water contact angle is larger than about 80° C., the solid surface is considered hydrophobic. As shown in Table 2, the water droplet contact angle of the paint coating of Comparative Example 3 is 71.7°. In Examples 3-6, the water droplet contact angle was increased to about 80° or even to about 86° by adding the silica nanoparticles obtained in Example 1 together with a crosslinking agent to the water-based paint.

In view of the aforesaid, the silica nanoparticles prepared by the method of the disclosure, in which a plurality of slow titrating steps and a plurality of continuous stirring steps are performed alternately in the specific titration procedure, may have a relatively narrow particle size distribution in a range from 20 nm to 40 nm. A paint composition containing the silica nanoparticles thus prepared and a crosslinking agent may have an improved hydrophobic property.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for preparing a silica nanoparticle precursor solution, comprising the steps of:
   a) pre-treating a siliceous rock to form a sodium silicate solution;
   b) slowly titrating the sodium silicate solution with an acid solution under stirring until a pH value of the sodium silicate solution is reduced by a predetermined value so as to obtain a silicic acid-containing solution;
   c) continuously stirring the silicic acid-containing solution until a pH value of the silicic acid-containing solution becomes constant;
   d) slowly titrating the silicic acid-containing solution with the acid solution under stirring until the pH value of the silicic acid-containing solution is reduced by the predetermined value so as to obtain a silicic acid-enriched solution having a silicic acid amount which is greater than that of the silicic acid-containing solution by a predetermined increment; and
   e) continuously stirring the silicic acid-enriched solution until the pH value of the silicic acid-enriched solution becomes constant if a pH value of the silicic acid-enriched solution does not reach a target pH value.

2. The method according to claim 1, further comprising a step of collecting the silicic acid-enriched solution as the silica nanoparticle precursor solution when the pH value of the silicic acid-enriched solution reaches the target pH value.

3. The method according to claim 1, further comprising, after step e), N additional steps of slowly titrating the silicic acid-enriched solution with the acid solution to permit the silicic acid-enriched solution to reach the target pH value, wherein N is an integer larger than 1.

4. The method according to claim 3, wherein each of the N additional steps of slowly titrating the silicic acid-enriched solution is performed until the pH value of the silicic acid-enriched solution is reduced by the predetermined value.

5. The method according to claim 3, further comprising, between two successive steps of the N additional steps of slowly titrating the silicic acid-enriched solution, a step of continuously stirring the silicic acid-enriched solution until the pH value of the silicic acid-enriched solution becomes constant.

6. The method according to claim 1, wherein the predetermined value is about 1.

7. The method according to claim 1, wherein the target pH value is about 7.

8. The method according to claim 1, wherein the continuously stirring the silicic acid-enriched solution is performed for a period ranging from about 25 minutes to about 35 minutes.

9. The method according to claim 1, wherein the acid solution is a hydrochloric acid solution having a concentration ranging from about 3 wt % to about 7 wt %.

10. The method according to claim 9, wherein the titrating is performed at a temperature ranging from about 55° C. to about 75° C.

11. The method according to claim 1, wherein step a) includes the sub-steps of:

a-1) crushing and grinding the siliceous rock to form siliceous rock powders; and
a-2) leaching the siliceous rock powders with an acidic leaching solution at a temperature below a boiling point of the acidic leaching solution to remove non-siliceous components so as to form acid-leached siliceous rock powders.

12. The method according to claim 11, wherein the acidic leaching solution is a sulfuric acid solution having a concentration ranging from about 3 M to about 6 M, and sub-step a-2) is performed at a temperature ranging from about 80° C. to about 95° C. for a period ranging from about 22 hours to about 26 hours.

13. The method according to claim 11, wherein step a) further includes, after sub-step a-2), a sub-step of a-3) leaching the acid-leached siliceous rock powders with a basic leaching solution at a temperature below a boiling point of the basic leaching solution to obtain the sodium silicate solution.

14. The method according to claim 13, wherein the basic leaching solution is a sodium hydroxide solution having a concentration ranging from about 25 wt % to about 35 w %, and sub-step a-3) is performed at a temperature ranging from about 80° C. to about 95° C. for a period ranging from about 28 hours to about 32 hours.

15. The method according to claim 1, wherein the siliceous rock is siliceous mudstone.

16. A method for preparing silica nanoparticles, comprising the steps of:
   a) pre-treating a siliceous rock to form a sodium silicate solution;
   b) slowly titrating the sodium silicate solution with an acid solution under stirring until a pH value of the sodium silicate solution is reduced by a predetermined value so as to obtain a silicic acid-containing solution;
   c) continuously stirring the silicic acid-containing solution until a pH value of the silicic acid-containing solution becomes constant;
   d) slowly titrating the silicic acid-containing solution with the acid solution under stirring until the pH value of the silicic acid-containing solution is reduced by the predetermined value so as to obtain a silicic acid-enriched solution having a silicic acid amount which is greater than that of the silicic acid-containing solution by a predetermined increment;
   e) continuously stirring the silicic acid-enriched solution until the pH value of the silicic acid-enriched solution becomes constant if a pH value of the silicic acid-enriched solution does not reach a target pH value;
   f) collecting the silicic acid-enriched solution as the silica nanoparticle precursor solution when the pH value of the silicic acid-enriched solution reaches the target pH value; and
   g) subjecting the silica nanoparticle precursor solution to a flame spray pyrolysis or a drying-grinding-calcining treatment to form the silica nanoparticles.

17. The method according to claim 16, further comprising, between step f) and g), a step of continuously stirring the silica nanoparticle precursor solution for a period ranging from about 3 hours to about 13 hours.

18. The method according to claim 16, wherein the drying-grinding-calcining treatment includes the sub-steps of:
   i) drying the silica nanoparticle precursor solution to form a dried silica nanoparticle precursor;
   ii) grinding the dried silica nanoparticle precursor to form silica nanoparticle precursor powders; and iii) calcining the silica nanoparticle precursor powders at a temperature ranging from about 900° C. to about 1000° C. to obtain the silica nanoparticles.

19. A paint composition, comprising:
the silica nanoparticles prepared by the method according to claim 16 in an amount ranging from about 0.5 part by weight to about 1 part by weight;
a crosslinking agent selected from the group consisting of polyisocyanate, melamine, aziridine, carbodiimide, and combinations thereof in an amount ranging from about 4 parts by weight to about 5 parts by weight; and
a balance of a water-based paint based on 100 parts by weight of the paint composition.

* * * * *